United States Patent [19]

Ichiyoshi

[11] Patent Number: 4,914,735

[45] Date of Patent: Apr. 3, 1990

[54] PROPAGATION TIME DETECTING SYSTEM WITH USE OF DETECTED PHASE DIFFERENCE OF TRANSMITTED AND RECEIVED SUBCARRIER

[75] Inventor: Osamu Ichiyoshi, Tokyo, Japan

[73] Assignee: NEC Corporation, Japan

[21] Appl. No.: 241,626

[22] Filed: Sep. 8, 1988

[30] Foreign Application Priority Data

Sep. 8, 1987 [JP] Japan ................................ 62-224876

[51] Int. Cl.$^4$ ............................................ G01S 13/32
[52] U.S. Cl. ...................................... 342/125; 342/127
[58] Field of Search ................ 342/125, 127, 118, 128, 342/130, 135

[56] References Cited

U.S. PATENT DOCUMENTS

| | | | |
|---|---|---|---|
| 4,010,465 | 3/1977 | Dodington et al. | 342/35 |
| 4,019,185 | 4/1977 | Morgan | 342/201 |
| 4,216,472 | 8/1980 | Albanese | 342/95 |
| 4,346,382 | 8/1982 | Bose et al. | 342/192 |
| 4,370,653 | 1/1983 | Crowley | 342/42 |
| 4,633,198 | 12/1986 | Goetz et al. | 342/25 X |
| 4,652,838 | 3/1987 | Nossen | 342/60 X |
| 4,758,839 | 7/1988 | Goebel et al. | 342/132 |

Primary Examiner—Thomas H. Tarcza
Assistant Examiner—John B. Sotomayor
Attorney, Agent, or Firm—Ostrolenk, Faber, Gerb & Soffen

[57] ABSTRACT

A propagation time detecting system wherein a transmitting station transmits to a receiving station, over a plurality of transmitting paths or lines having different propagation times, a transmission signal comprising a sequence of transmission data digitized by a clock signal of a clock frequency. The receiving station receives the transmission signal through the respective transmitting paths or lines as different received signals, and reproduces the sequence of transmission data and the clock signal as different reproduced sequences of transmission data and different reproduced clock signals, from which differences are detected among the different propagation times. In order to improve the accuracy of the detected differences, at least one subcarrier signal with a frequency higher than the clock frequency is also transmitted together with the transmission signal. The receiving station also reproduces the subcarrier signals as different reproduced subcarrier signals which are compared with each other to determine time differences therebetween with a reduced time order. In an application to a radar system, the transmission signal including the subcarrier signal is compared with an echo of the transmission signal from an target to determine the propagation time between the radar and the target.

20 Claims, 7 Drawing Sheets

PROPAGATION TIME DETECTING SYSTEM WITH USE OF DETECTED PHASE DIFFERENCE OF TRANSMITTED AND RECEIVED SUBCARRIER

BACKGROUND OF THE INVENTION:

1. Field of the Invention

The present invention relates to a propagation time detecting system for detecting a propagation time of a signal through a transmission path, or detecting a propagation time difference of a plurality of different transmission lines, and, in particular, to such a system having improved accuracy.

2. Description of the Prior Art

In a mobile communication system, it is necessary to know the current location of a moving body such as an aircraft. In order to know the current location, the aircraft or a base station transmits a signal through two, for example different signal transmission lines or paths. Detection is carried out for determining a propagation time different through the different transmission lines from which the distance between the aircraft and the base station and the current location of the aircraft are calculated.

On the other hand, a radar system can also measures a distance between the base station systen and a target, by detecting a time period from emission of a signal to arrival of the signal reflected by the target.

In the known propagation time detecting system used in a mobile communication system, a transmitting station modulates a carrier by a sequence of transmission data digitized by a clock signal into a modulated signal and transmits the modulated signal as a transmission signal through different transmission lines to a receiving station. The receiving station receives the transmission signal through the different transmission lines as different received signals and reproduces the transmission data and the clock signal as different reproduced transmission data and different reproduced clock signals. Detection is carried out for determining a difference in bit number between the different reproduced transmission data and for a time difference between the difference reproduced clock signals. The propagation time difference of the different transmission lines is calculated on the basis of the detected difference in bit number and the detected time difference.

In the radar system, the radar emits the modulated signal as an emitted signal and receives the emitted signal reflected by a target as a received signal. The radar reproduces the transmission data and the clock signal from the received signal as a reproduced sequence of transmission data and a reproduced clock signal and compares the reproduced sequence of transmission data and the reproduced clock signal with the sequence of transmission data and the clock signal to detect time differences between them as indicative of the propagation time of the transmission signal between the radar and the target. Thus, the distance from the radar to the target is calculated from the detected propagation time.

In the known propagation time detecting system, the transmission signal is subjected to any distortion during propagation through transmission lines. As a result, the reproduced clock signal has a jitter or a distortion. Accordingly, the accuracy of the detected time is limited by the jitter.

SUMMARY OF THE INVENTION

Accordingly, it is an object of the present invention to provide a propagation time detecting system where a propagation time can be detected with improved accuracy.

It is another object of the present invention to provide a propagation time detecting system which can be implemented without use of a complicated and large-scaled circuit formation.

It is still another object of the present invention to provide an improved transmission station used in the propagation time detecting system.

It is yet another object of the present invention to provide an improved receiving station used in the propagation time detecting system.

The present invention is applicable to a transmitting station for use in a propagation time detecting system. The transmitting system station comprises modulating means and transmitting means. The modulating means is for modulating a main carrier signal by a sequence of transmission data into a transmission modulated signal with the transmission data digitized by a reference clock signal having a reference clock frequency. The transmitting means is for transmitting the transmission modulated signal to a receiving station of the propagation time detecting system through first to M-th transmission paths with first through M-th propagation times as first through M-th transmission signals, respectively, where M represents a predetermined integer which is not less than two. The receiving station is for receiving the first through the M-th transmission signals to detect differences among the first through the M-th propagation times. In the transmitting station according to the present invention, the modulating means comprises preliminarily modulating means for modulating a transmission subcarrier signal having a predetermined subcarrier frequency by the transmission data into a preliminarily modulated signal, the predetermined subcarrier frequency being higher than the reference clock frequency; main modulating means for amplitude modulating the main carrier signal by the preliminarily modulated signal into a main modulated signal; and means for supplying the main modulated signal to the transmitting means as the transmission modulated signal.

The present invention is also applicable to a receiving station for use in a propagation time detecting system comprising a transmitting station for transmitting a transmission modulated signal through first to M-th transmission paths as first through M-th transmission signals, respectively, where M represents a predetermined integer which is not less than two. The transmission modulated signal is produced by modulating a main carrier signal by a preliminarily modulated signal into which a transmission subcarrier signal having predetermined subcarrier frequency is modulated by a sequence of transmission data digitized by a reference clock signal having a reference clock frequency, the predetermined subcarrier frequency being higher than the reference clock frequency. The receiving station comprises receiving means for receiving the first through the M-th transmission signals through the first to the M-th transmission paths with first through M-th propagation times, respectively, to produce first through M-th received signals; first through M-th demodulating means for demodulating the first through the M-th received signals into first through M-th demodulated signals, respectively; and processing means for processing the first through the M-th demodulated signals into a combination of differences among the first through the M-th propagation times.

In the receiving station according to the present invention, the first through the M-th demodulating means are for making the first through the M-th demodulated signals comprise first through M-th reproduced data sequences collectively as a reproduction of the sequence of transmission data; first through M-th reproduced clock signals collectively as a reproduction of the reference clock signal; and first through M-th reproduced subcarrier signals as a reproduction of the transmission subcarrier signal. The processing means is for processing the first through the M-th reproduced data sequences, the first through the M-th reproduced clock signals, and the first through the M-th reproduced subcarrier signals into the combination of differences.

The present invention is further applicable to a propagation time detecting system for detecting a propagation time of a single transmission signal which is propagated from a station back to the station as a returned signal through a transmission path. The transmission path compromises an object capable of reflecting the transmission signal. The station comprising modulating means for modulating a main carrier signal by a sequence of transmission data into a transmission modulated signal with the transmission data digitized by a reference clock signal having a reference clock frequency; transmitting means for transmitting the transmitting modulated signal through the transmission path; receiving means for receiving the returned signal to produce a received signal; demodulating means for demodulating the received signal into a demodulated signal, and processing means for processing the demodulated signal, the sequence of transmission data, and the reference clock signal into the propagation time.

In the propagation time detecting system according to the present invention, the modulating means comprises: preliminarily modulating means for modulating a transmission subcarrier signal having a predetermined subcarrier frequency by the transmission data into a preliminarily modulated signal, the predetermined subcarrier frequency being higher than the reference clock frequency; main modulating means for amplitude modulating the main carrier signal by the preliminarily modulated signal into a main modulated signal; and means for supplying the main modulated signal to the transmitting means as the transmission modulated signal. The demodulating means is for making the demodulated signal comprise a reproduced data sequence as a reproduction of the sequence of the transmission data, a reproduced clock signal as a reproduction of the reference clock signal, and a reproduced subcarrier signal as a reproduction of the transmission subcarrier signal. The processing means is for processing the reproduced data sequence, the reproduced clock signal, the reproduced subcarrier signal, the sequence of transmission data, the reference clock signal, and the transmission subcarrier signal into the propagation time.

DESCRIPTION OF PREFERRED EMBODIMENTS:

Prior to description of preferred embodiments, a known system will be explained below so as to promote a better understanding of the present invention.

Figure 1:
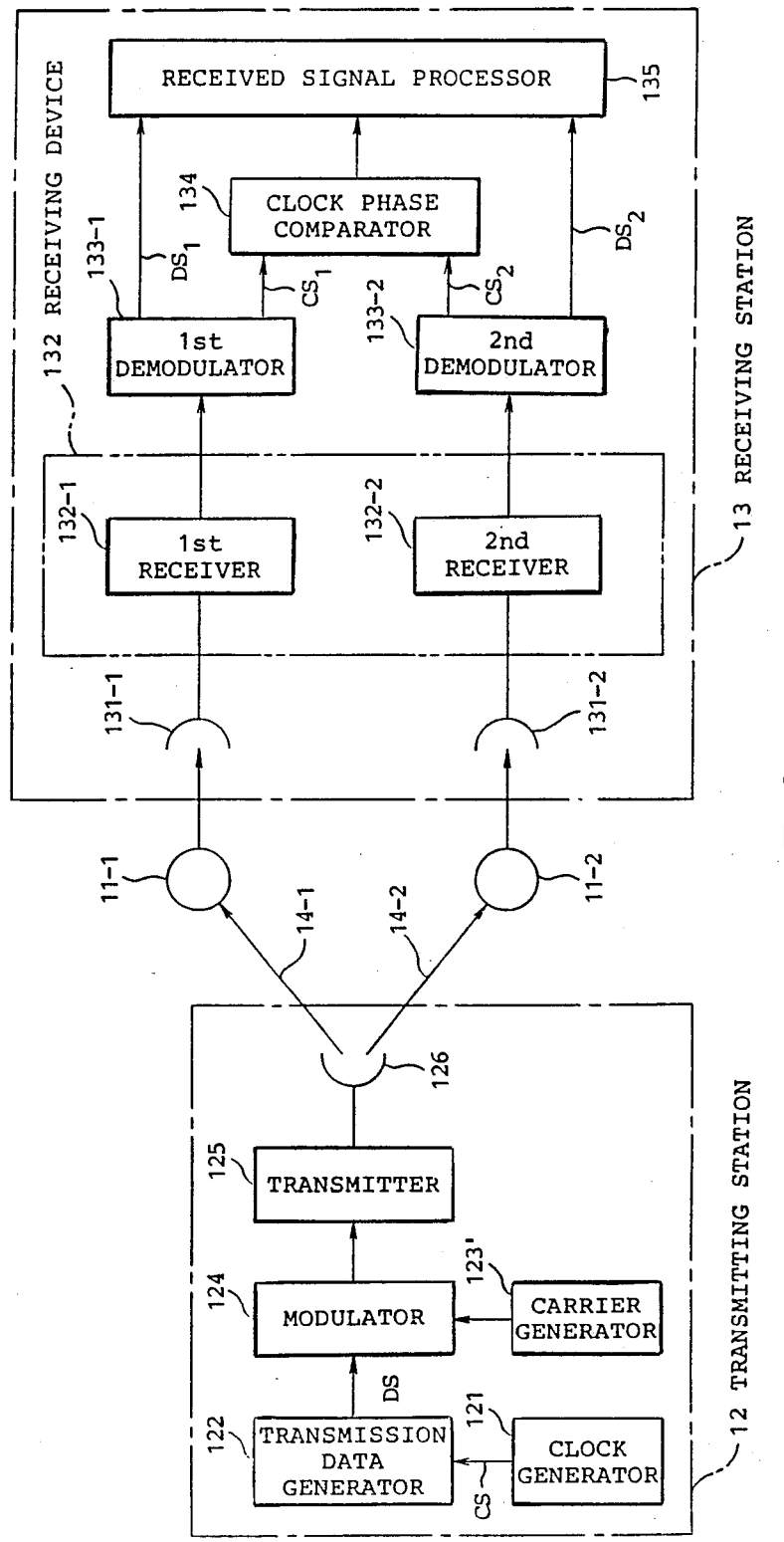
FIG. 1 is a block diagram view of a propagation time detecting system knowm in the prior art.

FIG. 1 shows a known propagation time detecting system for a mobile satellite communication system. This system comprises a plurality of (M) communication satellites (only two satellites are exemplarily shown at 11-1 and 11-2), a transmitting station 12 mounted on either one of a mobile body and a base station, and a receiving station 13 mounted on the other of the mobile body and a base station. A signal is transmitted from the transmitting station 12 to the first and second satellites 11-1 and 11-2 which, in turn, repeat and transmit the signal as transmission signals to the receiving station 13. Accordingly, the signal from the transmitting station 12 is transmitted to the receiving station 13 as two transmission signals through two transmission lines paths 14-1 and 14-2 including two satellites 11-1 and 11-2, respectively.

The transmitting station 12 comprises a clock generator 121 for generating a clock signal Cs having a clock frequency, a transmission data generating circuit 122 for generating a sequence of transmission data digitized by the clock signal Cs, a carrier generator 123' for generating a carrier signal having a carrier frequency, a modulator 124 for digitally modulating the carrier signal by the transmission data into a transmission modulated signal, and a transmitter 125 comprising an up-converter, a high power amplifier, and other devices (not shown) for transmitting the transmission modulated signal with a high power at a predetermined radio frequency band through a transmitting antenna 126 of low directivity. The transmitting antenna 126 emits the transmission modulated signals into space as emitted signals. The emitted signals are received at first and second communication satellites 11-1 and 11-2 and are repeated and transmitted therefrom to the receiving station 13 as the transmission signals, as described above.

The receiving station 13 receives the transmission signals through first and second receiving antennas 131-1 and 131-2 of high directivity facing the first and second communication satellites 11-1 and 11-2, respectively. First and second receivers 132-1 and 132-2 are connected to the first and second receiving antennas 131-1 and 131-2, each having a low noise amplifier, a down converter, and other devices (not shown). The first and second receivers 132-1 and 132-2 convert the transmission signals received at first and second receiving antennas 131-1 and 131-2 into first and second received signals within a predetermined frequency band, respectively. First and second demodulators 133-1 and 133-2 demodulate the first and second received signals from the first and second receivers 132-1 and 132-2 to produce first and second reproduced data sequences Ds$_1$ and Ds$_2$ which are a reproduction of the sequence of the transmission data; and first and second reproduced clock signals Cs$_1$ and Cs$_2$ as which are a reproduction of the clock signals Cs, respectively. A clock phase comparator 134 compares phases of both of the first and second reproduced clock signals Cs$_1$ and Cs$_2$ to produce a clock phase difference $\Delta t$ between the first and second reproduced clock signals Cs$_1$ and Cs$_2$. A received signal processing circuit 135 receives the the first and second reproduced data sequences Ds$_1$ and Ds$_2$ and the clock phase difference $\Delta t$ and determines a propagation time difference between the first and second transmission lines 14-1 and 14-2.

Figure 2:
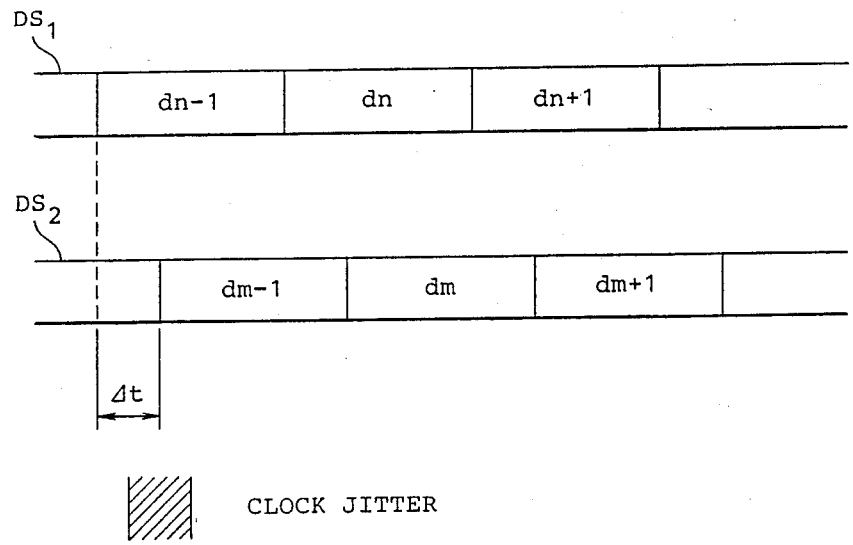
FIG. 2 is a schematic view illustrating detection of propagation time difference in the known systen of FIG. 1.

Referring to FIG. 2, the received signal processing circuit 135 compares the first reproduced data sequence Ds$_1$ (..., d$_{n-1}$, d$_n$, d$_{n+1}$, ...) and the second reproduced data sequences Ds$_2$ (..., d$_{m-1}$, d$_m$, d$_{m+1}$, ...) to determine a time difference (n−m)t$_b$ between the first and second reproduced data sequences Ds$_1$ and Ds$_2$ on the basis of the bit number. In this connection, t$_b$ represents a time length of one bit. Then, the received signal processing circuit 135 calculates ((n−m)t$_b$+$\Delta t$) as the propagation time difference between propagation times through the first and second transmission lines 14-1 and 14-2. However, the first and second reproduced clock signals Cs$_1$ and C$_2$ have jitter caused by transmission through the first and second transmission lines 14-1 and 14-2, as shown in FIG. 2. Therefore, accuracy of the calculated propagation time difference is limited by the jitter.

For example, a mobile satellite communication system uses a clock signal of about 5 kHz. Now, providing that the clock phase difference can be measured at a minimum 1/10 period (which is 36 angular degrees in the phase error) with a sufficient reliability taking into consideration the jitter, the clock phase difference $\Delta t$ is given by:

$$\Delta t = 1/10 \times 5 \times 10^3) = 2 \times 10^{-5} \text{ (sec)} \quad (1)$$

The clock phase difference $\Delta t$ determines the accuracy of the propagation time difference detected by the known system. Accordingly, $\Delta t$ results in an error of distance calculated from the propagation time difference. The error of distance $\Delta l$ is given by:

$$\Delta l = c \times \Delta t = 3 \times 10^8 \times 2 \times 10^{-5} = 6000 \text{(m)} \quad (2)$$

where c is the velocity of light and is $3 \times 10^8$ (m/sec).

Figure 3:
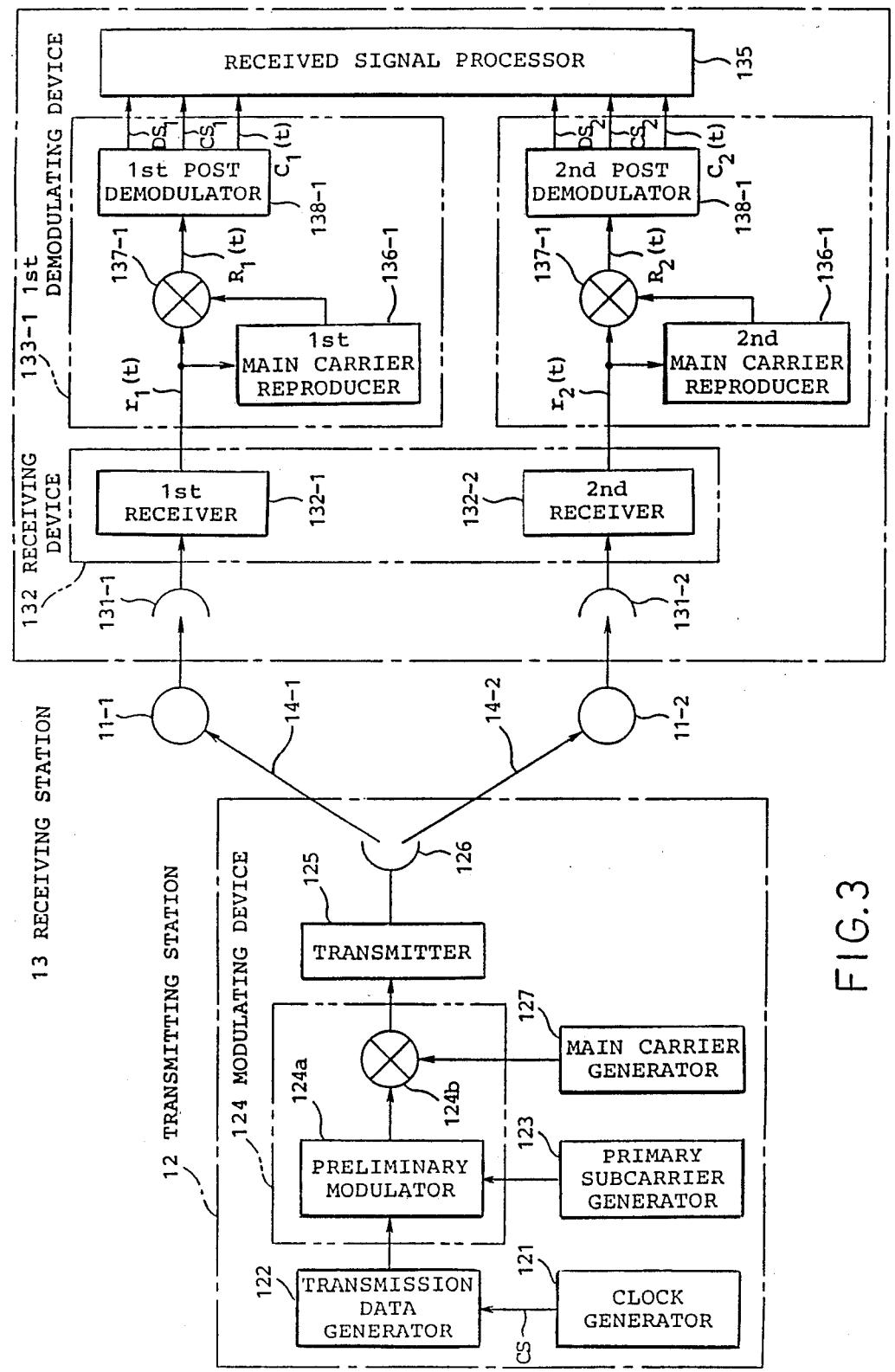
FIG. 3 is a block diagram view of a propagation time detecting system according to an embodiment of the present invention.

FIG. 3 illustrates a configuration of a propagation time detecting system according to an embodiment of the present invention. Similar functional parts are represented by the same reference symbols as in the known system in FIG. 1.

Referring to FIG. 3, the transmission station is similar to the transmitting station 12 in FIG. 1 except for provision of a primary subcarrier generator 123 in place of carrier generator 123', and a main carrier generator 127, and except that the modulating device 124 comprises a preliminary modulator 124a and a mixer 124b.

The primary subcarrier generator 123 generates a primary subcarrier signal having a primary subcarrier frequency f$_1$ which is higher than the clock frequency of the clock signal Cs. The primary subcarrier signal is applied to a preliminary modulator 124a. The preliminary modulator 124 digitally modulates the primary subcarrier signal (f$_1$) by the transmission data to produce a modulated signal which is applied to one input of the mixer 124b as a preliminarily modulated signal.

Figure 4:
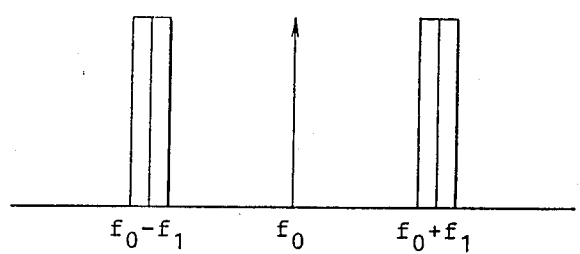
FIG. 4 is a frequency spectrum of a transmission modulating signal in the system of FIG. 3.

The main carrier generator 127 generates a main carrier signal with a frequency f$_0$ which is applied to the other input of the mixer 124b. As a result, the mixer 124b amplitude modulates the main carrier signal (f$_0$) by the preliminarily modulated signal from the preliminary modulator 124a and produces a double side-band modulator signal. The double side-band modulated signal comprises side-band components (f$_0$+f$_1$ and f$_0$−f$_1$) above and below the main carrier signal (f$_0$) as shown in FIG. 4. Therefore, the mixer 124b functions as a main modulating means.

The double side-band modulated signal is supplied to the transmitter 125 as a transmission modulated signal which is transmitted to satellites 11-1 and 11-2 through the transmitting antenna 126.

The double side-band signal is represented by:

$$\begin{aligned} V(t) &= A\cos\omega_0 t + \cos[(\omega_0 - \omega_1)t - \theta(t)] + \\ &\quad \cos[(\omega_0 + \omega_1)t + \theta(t)] \\ &= A\cos\omega_0 t + 2\cos\omega_0 t \cos[\omega_1 t + \theta(t)]. \end{aligned} \quad (3)$$

Where, $\omega_0$ is an angular frequency of the main carrier signal (f$_0$), $\omega_1$ is an angular frequency of the primary subcarrier signal (f$_1$), $\theta(t)$ is a phase caused by modulation, and A is an amplitude of the main carrier signal (f$_0$). The modulation phase $\theta(t)$ is a phase value of 0 degree or 180 degree on basis of the clock period in the digital modulation of two phase PSK. With respect to the main carrier signal (f$_0$), the amplitude A can be made as A=0. However, because the main carrier signal (f$_0$) is reproduced at the receiving station, it is useful for simplification of the main carrier reproducing circuit (136-1 and 136-2) not to suppress the main carrier signal (f$_0$).

In comparison with the receiving station in the known system of FIG. 1, the receiving station 13 does not have the clock phase comparator 134; and the first and second demodulating devices 133-1 and 133-2 respectively first and second main carrier reproducers 136-1 and 136-2, first and second mixers 137-1 and 137-2, and first and second post demodulators 138-1 and 138-2.

The first and second main carrier reproducers 136-1 and 136-2 comprise phase-locked loops and process the first and second received signals r$_1$(t) and r$_2$(t) from the first and second receivers 132-1 and 132-2 to reproduce the main carrier signal as first and second reproduced main carrier signals. The first and second mixers 137-1 and 137-2 mix the first and second received signals r$_1$(t) and r$_2$(t) and the first and second reproduced main carrier signals to produce first and second preliminary demodulated signals R$_1$(t) and R$_2$(t) which are applied to the first and second post demodulated 138-1 and 138-2, respectively. The first and second post demodulators 138-1 and 138-2 demodulate the first and second preliminary demodulated signals $R_1(t)$ and $R_2(t)$ to produce first and second reproduced primary subcarrier signals $C_1(t)$ and $C_2(t)$ as a reproduction of the primary subcarrier signal, first and second reproduced clock signals $Cs_1$ and $Cs_2$ as a reproduction of the clock signal Cs, and first and second reproduced transmission data $DS_1$ and $DS_2$ as a reproduction of the transmission data. Those first and second reproduced primary subcarrier signals, the first and second reproduced clock signals, and the first and second reproduced transmission data are applied to the received signal processing circuit 135 from the demodulators 138-1 and 138-2.

Assuming that $T_1$ and $T_2$ represent the delay times at of two transmission lines 14-1 and 14-2, respectively, the received signals $r_1(t)$ and $r_2(t)$ from the first and second receivers 132-1 and 132-2 are given by:

$$r_1(t) = \cos[\omega_1(t-T_1) + \theta(t-T_1)]$$
$$\times \cos[\omega_0(t-T_1) + \phi_1] + \cos\omega_0[(t-T_1) + \phi_1] \quad (4)$$

$$r_2(t) = \cos[\omega_1(t-T_2) + \theta(t-T_2)]$$
$$\times \cos[\omega_0(t-T_2) + \phi_2] + \cos\omega_0[(t-T_2) + \phi_2] \quad (5)$$

where, $\phi_1$ and $\phi_2$ are phase distortions caused by the transmission lines 14-1 and 14-2, respectively. Those distortions have correlation with each other and effect variation. The preliminary demodulation signals are represented by the following equations:

$$R_1(t) = \cos[\omega_1(t-T_1) + \theta(t-T_1)] \quad (6)$$

$$R_2(t) = \cos[\omega_1(t-T_2) + \theta(t-T_2)] \quad (7)$$

That is, the mixture 137-1 and 137-2 remove the effect of the random phase distortions $\phi_1$ and $\phi_2$ caused by the different transmission lines 14-1 and 14-2 and only obtained components having a connection with the propagation delay time.

The first and second post demodulators 138-1 and 138-2 perform coherent demodulation onto the first and second preliminarily demodulation signals represented by Equations (6) and (7). The first and second reproduced primary subcarrier signals $C_1(t)$ and $C_2(t)$ are represented by the following equations (8) and (9):

$$C_1(t) = \cos[\omega_1(t-T_1)] \quad (8)$$

$$C_2(t) = \cos[\omega_1(t-T_2)] \quad (9)$$

Figure 5:
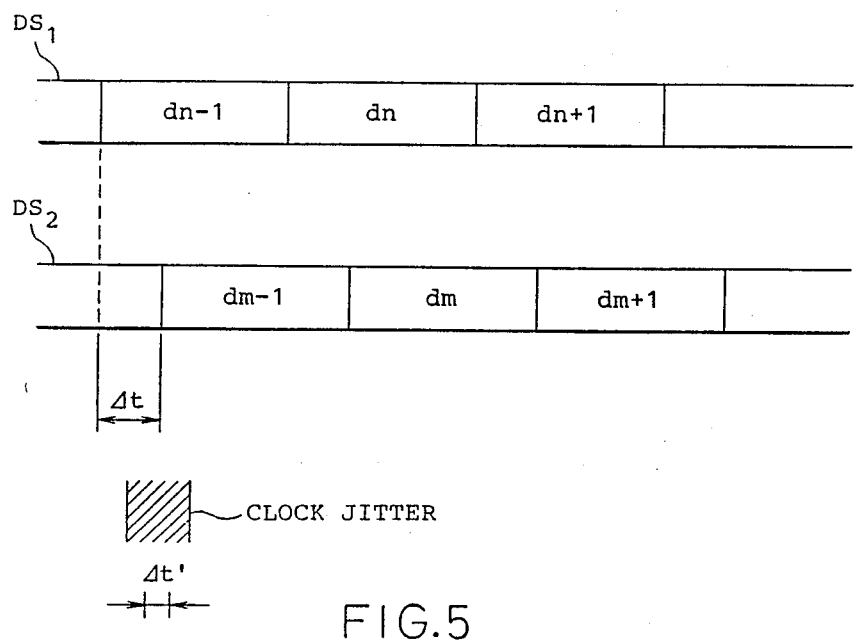
FIG. 5 is a schematic view illustrating detection of a propagation time difference in the system of FIG. 3.

Referring to FIG. 5, the received signal processing circuit 135 compares the first reproduced transmission data $DS_1$ ( ..., $d_{n-1}$, $d_n$, $d_{n+1}$, ... ) and the second reproduced transmission data $DS_2$ ( ..., $d_{m-1}$, $d_m$, $d_{m+1}$, ... ) to determine a time difference $(n-m)t_b$ between the first and second reproduced transmission data $DS_1$ and $DS_2$ on the basis of the bit number. Further, the received signal processing circuit 135 determines the clock phase difference $\Delta t$ between both of the first and second reproduced clock signals $Cs_1$ and $Cs_2$.

Although the above operation is similar to that in the known system, the present invention attempts to detect a subcarrier phase difference $\Delta t'$ between the first and second reproduced primary subcarrier signals $C_1(t)$ and $C_2(t)$ and to obtain the propagation time difference $\Delta T_{12}$ between the transmission lines 14-1 and 14-2 according to the following equation (10):

$$\Delta T_{12} = \Delta t'/\omega_1 \quad (10)$$

In the known system, the clock phase difference $\Delta t$ can be detected with an accuracy of $\Delta t = 2 \times 10^{-5}$ (sec) as represented by Equation (1). In order to enable the detection of the phase difference of the first and second reproduced primary subcarrier signals $C_1(t)$ and $C_2(t)$ during the time period of $\Delta t$, it is necessary that two or more wavelengths of the primary subcarrier signal are not present during the time period of $\Delta t$, that is, $\Delta t$ and the primary subcarrier frequency $f_1$ have the following relation:

$$f_1 \times \Delta t < \frac{1}{2} \quad (11)$$

Accordingly, providing that $f_1 = 50$ kHz and the phase difference of the first and second reproduced primary subcarrier signals $C_1(t)$ and $C_2(t)$ can be measured with an accuracy of 1/10 (about 36 degrees), the phase difference $\Delta t'$ is given by:

$$\Delta t' = 1/10 f_1 = 1/10 \times 50 \times 10^3 = 2 \times 10^{-6} \text{ (sec)} \quad (12)$$

Therefore, the accuracy $\Delta 1'$ of the measured distance is given by:

$$\Delta 1' = c \times \Delta t' = 600 \text{(m)} \quad (13)$$

The accuracy is improved by one order of magnitude in comparison with the accuracy of the known system and is sufficient in practical use.

Figure 6:
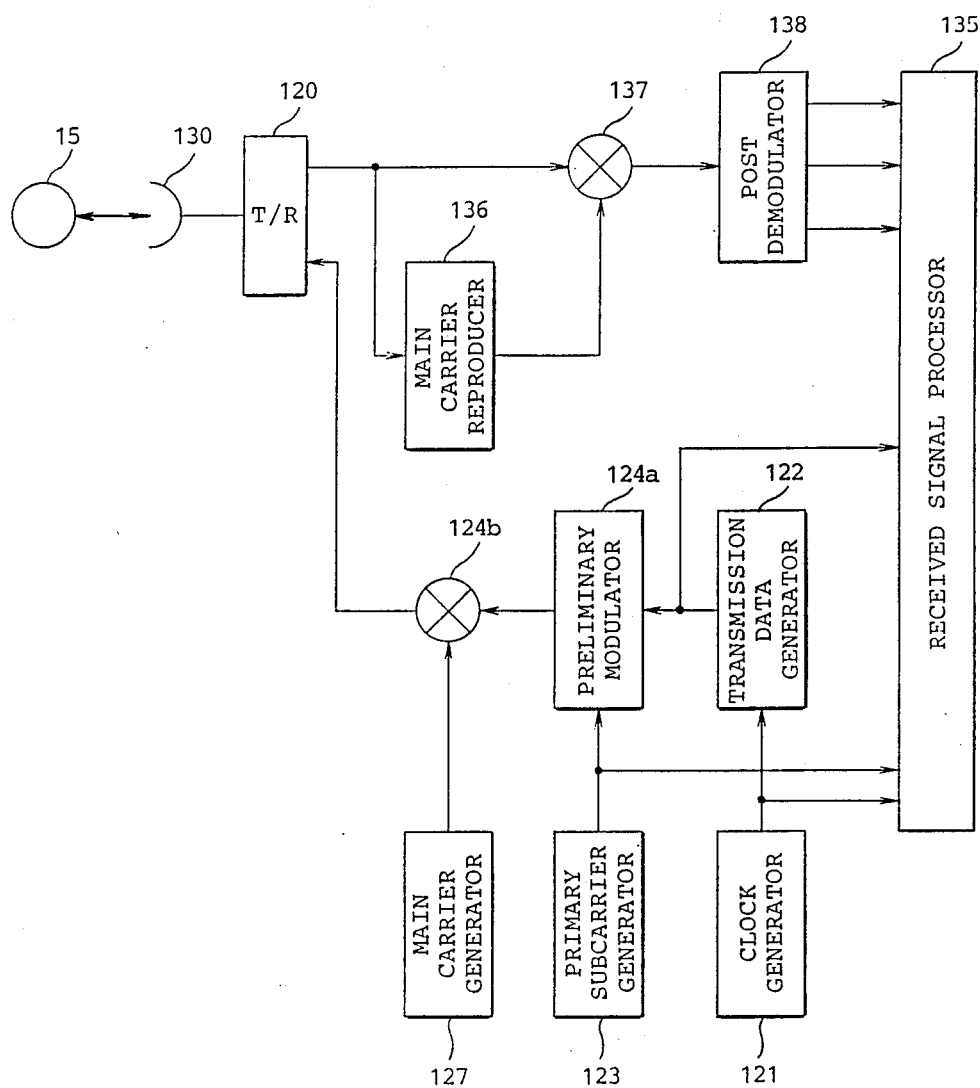
FIG. 6 is a block diagram view of a propagation time detecting system applied to a radar system according to another embodiment of the present invention.

Referring to FIG. 6, the present invention is described in connection with a propagation time detecting system used in a radar system. Similar parts are represented by the same reference symbols as in FIG. 3.

The radar system has the transmitting station and the receiving station located at the same position and a single transmission line (path) between the transmitting and receiving station and a target through which the transmission signal propagates. Accordingly, this propagation time detecting system comprises a transmitter and receiver (T/R) circuit 120 which receives the transmission modulated signal from the mixer 124b and transmits the signals into space through a transmitting and receiving antenna 130 as a transmission signal. The transmission signal is reflected at the target 15 as a reflected signal which is received at the transmitting and receiving antenna 130. The transmitting and receiving circuit 120 is responsive to the reflected signal received at the transmitting and receiving antenna 130 and produces a received signal. The received signal is processed through a single modulator which comprises the main carrier reproducer 136, the mixer 137 and post demodulator 138 in a similar manner as those circuits 136-1 through 138-1 in FIG. 3. Then, the reproduced primary subcarrier signal, the reproduced clock signal, and the reproduced transmission data are applied from the post demodulator 138 to the received signal processor 135 as the first reproduced transmission data, the first reproduced clock signal, and the first reproduced primary subcarrier signal. In the illustrated embodiment, since the transmission signal is single, the modulator is also single. Further, the transmission data, the clock signal, and the primary subcarrier signal are supplied from the transmission data generator 122, the clock generator 121, and the primary subcarrier generator 123 to the received signal processing circuit 135 as the second reproduced transmission data, the second reproduced clock signal, and the second reproduced primary subcarrier signal. Then, a received signal processing circuit 135 processes those signals in the similar manner as described in connection with the received signal processing circuit 135 in FIG. 3. Thus, the propagation time is detected for a distance from the transmitting and receiving antenna 130 and the target 15.

Figure 7:
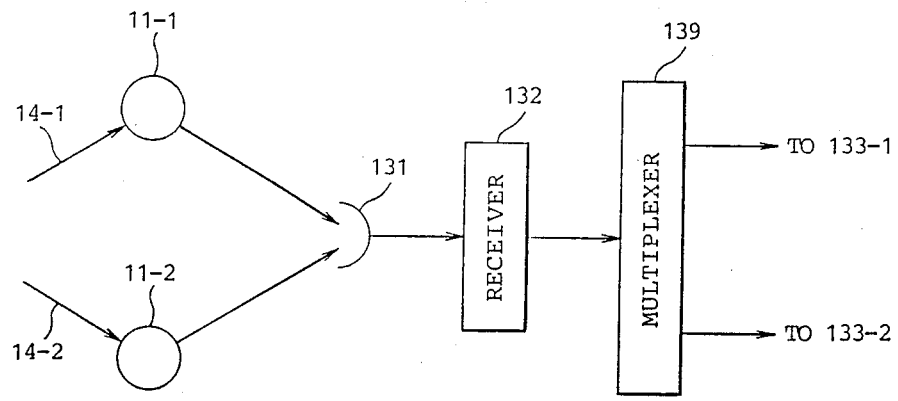
FIG. 7 is a block diagram view of a modification of a receiving station in the system of FIG. 3.

Referring to FIG. 7, it is possible to commonly use a single receiving antenna 131 for the two satellites 11-1 and 11-2, in contrast to the first and second receiving antennas 131-1 and 131-2 which are used for the two satellites 11-1 and 11-2 in FIG. 3. In this case, the common receiving antenna 131 is a low directivity type. A single receiver 132 is coupled to the common receiving antenna 131 and a multiplexer 139 is coupled to the receiver 132.

In the satellite communication system, each satellite repeats a signal received thereat with a frequency band assigned thereto. Therefore, two satellites 11-1 and 11-2 transmit the repeated signals on different frequency bands. The single receiving antenna 131 receives the repeated signals together and the receiver 132 produces a main received signal through the receiving antenna 131. Thus, the multiplexer 139 can separate the main received signal according to frequency into two received signals corresponding to the repeated signals. Those received signals are applied to the first and second demodulators 133-1 and 133-2 in FIG. 3.

Figure 8:
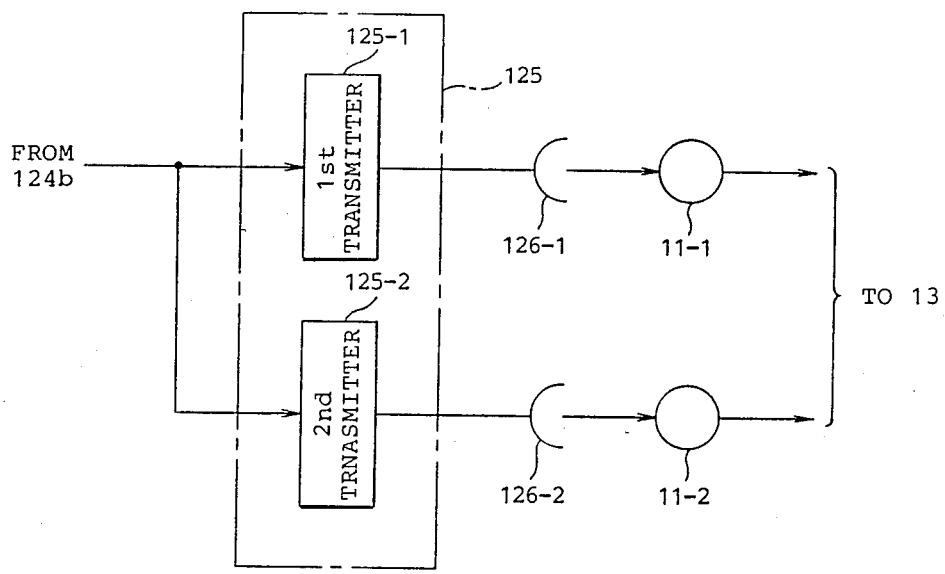
FIG. 8 is a block diagram view of a modification of a transmitting station in the system of FIG. 3.

Referring to FIG. 8, the transmitting station 12 can be made to be provided with first and second transmitters 125-1 and 125-2 in place of a single transmitter. The transmission modulated signal from the multiplexer 124b is transmitted from the first and second transmitters 125-1 and 125-2 at different frequency bands through first and second transmitting antennas 126-1 and 126-2. In this case, the receiving station is formed similar to that shown in FIG. 7, but can be formed similar to that shown in FIG. 3.

Figure 9:
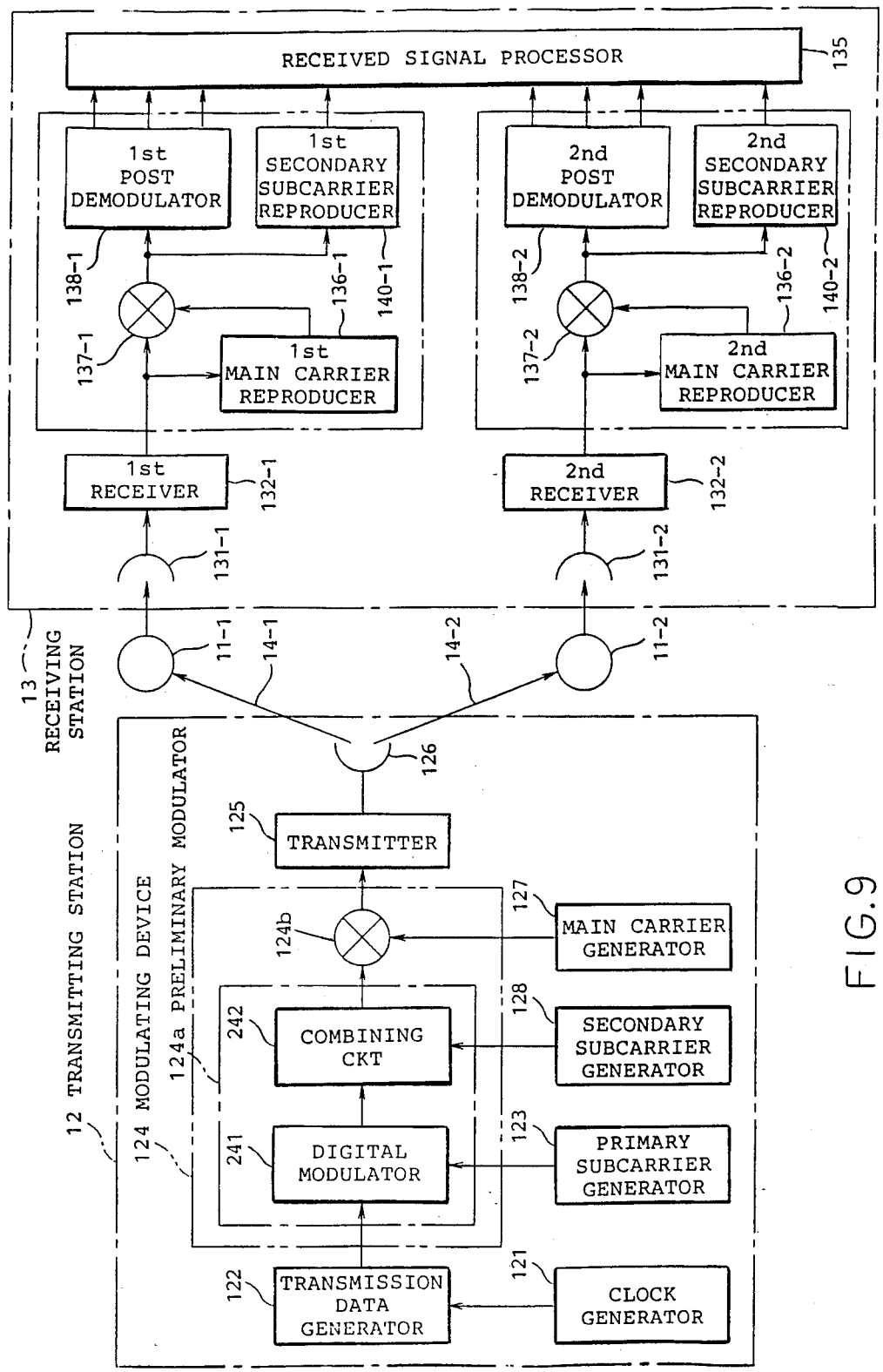
FIG. 9 is a block diagram view of a propagation time detecting system according to another embodiment of the present invention.

Referring to FIG. 9, another embodiment is shown wherein a secondary subcarrier signal is also used in addition to the primary subcarrier signal used in the embodiment of FIG. 3. That is, in comparison with the embodiment of FIG. 3, a secondary subcarrier generator 128 and a combining circuit 242 are added and the preliminary modulator 124a comprises a digital modulator 241 and the combining circuit 242 such as an adder in the transmitting station 12. The receiving station 13 additionally comprises first and second secondary subcarrier reproduces 140-1 and 140-2.

Figure 10:
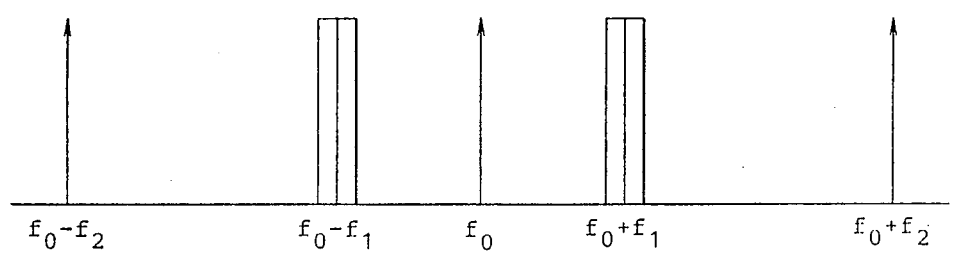
FIG. 10 is a frequency spectrum of a transmission modulating signal in the system of FIG. 9.

In this embodiment, the primary subcarrier signal is digitally modulated by the transmission data at the digital modulator 241 into a digitally modulated signal. The secondary subcarrier generator 128 generates a secondary subcarrier signal with a secondary subcarrier frequency ($f_2$) which is higher than the primary subcarrier frequency ($f_1$). The combining circuit 242 combines the secondary subcarrier signal and the digitally modulated signal to produce a combined signal. The combined signal is supplied to the mixer 124b as the preliminary modulated signal. The mixer 124b amplitude modulates the main carrier signal ($f_0$) by the preliminarily modulated signal to produce the transmission modulated signal, as described above. The transmission modulated signal comprises the main carrier signal component ($f_0$), side-band modulated signal components ($f_0+f_1$) and ($f_0-f_1$), and further side-band modulated signal components ($f_0+f_2$) and ($f_0-f_2$) as shown in FIG. 10.

In the receiving station 13, the first and second preliminary demodulated signals from the first and second mixers 137-1 and 137-2 additionally include the secondary subcarrier signal components and are applied to the first and second secondary subcarrier reproducers 140-1 and 140-2. The first and second secondary subcarrier reproducers 140-1 and 140-2 comprise phase locked loops and reproduce the secondary subcarrier signal as first and second reproduced secondary subcarrier signals. The first and second reproduced secondary subcarrier signals are supplied to the received signal processing circuit 135.

The other circuits in the receiving station 13 operate as described in connection with FIG. 3.

The received signal processing circuit 135 processes the first and second reproduced secondary subcarrier signals and detects a time difference between them in addition to the above-described processing of the first and second reproduced transmission data, the first and second reproduced clock signals, and the first and second reproduced primary subcarrier signals in a manner similar to the embodiment of FIG. 3.

According to this embodiment, improved accuracy is obtained in detection of the time difference between the propagation times of the two transmission lines 14-1 and 14-2.

For reasons similar to relation (11) between the primary subcarrier signal and the clock signal, the secondary subcarrier frequency ($f_2$) has the following relation (14) with the primary subcarrier signal:

$$f_2 \cdot \Delta t' < \tfrac{1}{2} \qquad (14):$$

Accordingly, it is provided that $f_1=50$ kHz and $f_2=500$ kHz when the first and second reproduced primary and secondary subcarrier signals can be measured with an accuracy of 1/10 (about 36 degrees). Then, the phase difference $\Delta t''$ between the first and second reproduced secondary subcarrier signals is given by:

$$\Delta t \Delta = 1/10 f_2 = 2 \times 10^{-7} (\text{sec}) \qquad (15)$$

Therefore, the accuracy of $\Delta 1''$ of the measured distance is given by:

$$\Delta 1'' = c \times \Delta t'' = 60 (\text{m}) \qquad (16)$$

It will be understood that the accuracy is considerably improved.

In the embodiment of FIG. 9, the secondary subcarrier generator 128 only generates the secondary subcarrier signal with the secondary subcarrier frequency $f_2$. However, other subcarrier signals of other higher frequencies can be generated and combined with the preliminarily modulated signal at the mixer 124b.

What is claimed is:

1. In a transmitting station in a propagation time detecting system, said transmitting station comprising:
   modulating means for modulating a main carrier signal having a main carrier frequency by a sequence of transmission data to produce a transmission modulated signal with said transmission data digitized by a reference clock signal having a reference clock frequency, and
   transmitting means for transmitting said transmission modulated signal to a receiving station of said propagation time detecting system through first to M-th transmission paths with first through M-th propagation times as first through M-th transmission signals, respectively, where M represents a predetermined integer which is not less than two, said first to M-th transmission paths including respective repeated devices, said receiving station receiving said first through said M-th transmission signals to detect differences among said first through said M-th propagation times, the improvement wherein said modulating means comprises:

preliminary modulating means for modulating a transmission subcarrier signal having a predetermined subcarrier frequency by said transmission data to produce a preliminary modulated signal, said predetermined subcarrier frequency being higher than said reference clock frequency and different from said main carrier frequency;

main modulating means for amplitude modulating said main carrier signal by said preliminary modulated signal to produce a main modulated signal; and means for supplying said main modulated signal to said transmitting means as said transmission modulated signal.

2. A transmitting station as claimed in claim 1, wherein said preliminary modulating means comprises digital modulating means for digitally modulating said transmission subcarrier signal by said transmission data to produce a digitally modulated signal, and means for supplying said digitally modulated signal to said main modulating means as said preliminarily modulated signal.

3. A transmitting station as claimed in claim 2, wherein said digital modulating means is a phase-shift keying modulator.

4. A transmitting station as claimed in claim 2, wherein said reference clock frequency is five kilohertz and, said transmission subcarrier frequency is fifty kilohertz.

5. A transmitting station claimed in claim 1, said transmission subcarrier signal comprising a primary subcarrier signal having a primary subcarrier frequency different from said main carrier frequency and a secondary subcarrier signal having a secondary subcarrier frequency which is higher than said primary subcarrier frequency and different from said main carrier frequency, wherein said preliminary modulating means comprises digital modulating means for digitally modulating said primart subcarrier signal by said transmission data to produce a digitally modulated signal, combining means for combining said digitally modulated signal and said secondary subcarrier signal to produce a combined signal, and means for supplying said combined signal to said main modulating means as said preliminarily modulated signal.

6. A transmitting station as claimed in claim 5, wherein said digital modulating means is a phase-shift keying modulator.

7. A transmitting station as claimed in claim 1, wherein said first through said M-th transmission signals have a predetermined transmission frequency band in common.

8. A transmitting station as claimed in claim 1, wherein said transmitting means comprises first through M-th partial transmitting means for transmitting said transmission modulated signal as said first through said M-th transmission signals, respectively, said first through said M-th transmission signals having first through M-th predetermined transmission frequency bands which are different from one another.

9. A transmitting station as claimed in claim 1, wherein said main modulated signal has double sideband modulated components.

10. In a receiving station in a propagation time detecting system comprising:

a transmitting station which transmits a transmission modulated signal through first to M-th transmission paths including respective repeated devices, as first through M-th transmission signals, respectively, where M represents a predetermined integer which is not less than two, said transmission modulated signal being produced by modulating a main carrier signal having a main carrier frequency by a preliminarily modulated signal into which a transmission subcarrier signal of a predetermined subcarrier frequency is modulated by a sequence of transmission data digitized by a reference clock signal having a reference clock frequency, said predetermined subcarrier frequency being higher than said reference clock frequency and different from said main carrier frequency, said receiving station comprising receiving means for receiving the first through the M-th transmission signals through said first to said M-th transmission paths with first through M-th propagation times, respectively, to produce first through M-th received signals, first through M-th demodulating means for demodulating said first through said M-th received signals to produce first through M-th demodulated signals, respectively, and processing means for processing said first through said M-th demodulated signals to determine a combination of differences among said first through said M-th propagation times, the improvement wherein:

said first through said M-th demodulating means are for making said first through said m-th demodulated signals comprise: first through M-th reproduced data sequences collectively as a reproduction of said sequence of transmission data; first through M-th reproduced clock signals collectively as a reproduction of said reference clock signal; and first through M-th reproduced subcarrier signals as a reproduction of said transmission subcarrier signal;

said processing means being for processing said first through said M-th reproduced data sequences, said first through M-th reproduced clock signals, and said first through M-th reproduced subcarrier signals to determine said combination of differences.

11. A receiving station as claimed in claim 10, wherein said first through said M-th demodulating means comprise first through M-th main carrier reproducing means repsonsive to said first through said M-th received signals for reproducing said main carrier signal as first through M-th reproduced main carrier signals, first through M-th main demodulating means for demodulating said first through said M-th received signals by said first through said M-th reproduced main carrier signals to produce first through M-th main demodulated signals collectively as a reproduction of said preliminarily modulated signal, and first through M-th post demodulating means for demodulating said first through said M-th main demodulated signals to produce said first through said M-th reproduced data sequences, said first through said M-th reproduced clock signals, and said first though said M-th reproduced subcarrier signals.

12. A receiving station as claimed in claim 10, wherein said transmission subcarrier signal comprises a primary subcarrier signal having a primary subcarrier frequency different from said main carrier frequency and a secondary subcarrier signal having a secondary subcarrier frequency which is higher than said primary subcarrier frequency and different from said main carrier frequency, wherein said first through said M-th demodulating means are for producing first through M-th reproduced primary subcarrier signals and first through M-th reproduced secondary subcarrier signals as said first through said M-th reproduced subcarrier signals, said processing means being for processing said first through said M-th reproduced data sequences, said first through said M-th reproduced clock signals, said first through said M-th reproduced primary subcarrier signals, and said first through said M-th reproduced secondary subcarrier signals, to determine said combination of differences.

13. A receiving signal as claimed in claim 12, wherein said first through said M-th demodulating means comprise first through M-th main carrier reproducing means responsive to said first through said M-th received signals for reproducing said main carrier signal as first through M-th reproduced main carrier signals, first through M-th main demodulating means for demodulating said first through said M-th received signals by said first through said M-th reproduced main carrier signals to produce first through M-th main demodulated signals collectively as a reproduction of said preliminarily modulated signal, first through M-th post demodulating means for demodulating said first through said M-th main demodulated signals to produce said first through said M-th reproduced data sequences, said first through said M-th reproduced clock signals, and said first through said M-th reproduced primary subcarrier signals, and first through M-th secondary subcarrier reproducing means for reproducing said secondary subcarrier signal as said first through said M-th reproduced secondary subcarrier signals.

14. A receiving station as claimed in claim 10, said first through said M-th transmission signals being in first through M-th predetermined transmission frequency bands, respectively, which are different from one another, wherein said receiving means comprises separating means for separating according to frequency said first through said M-th received signals from the first through the M-th transmission signals which are received collectively as a main received signal.

15. In a propagation time detecting system which detects a propagation time of a transmission signal which is propagated away from a station and back to said station as a returned signal through a transmission path, said path comprising an object which reflects said transmission signal, said station comprising:
modulating means for modulating a main carrier signal having a main carrier frequency by a sequence of transmission data to produce a transmission modulated signal with said transmission data digitized by a reference clock signal having a reference clock frequency,
transmitting means for transmitting said transmission modulated signal through said transmission path,
receiving means for receiving said returned signal to produce a received signal,
demodulating means for demodulating said received signal to produce a demodulated signal, and
processing means for processing said demodulated signal, said sequency of transmission data, and said reference clock signal to determine said propagation time,
the improvement wherein said modulating means comprises:
preliminary modulating means for modulating a transmission subcarrier signal having a predetermined subcarrier frequency by said transmission data to produce a preliminary modulated signal, said predetermined subcarrier frequency being higher than said reference clock frequency and different from said main carrier frequency;
main modulating means for amplitude modulating said main carrier signal by said preliminary modulated signal to produce a main modulated signal; and
means for supplying said main modulated signal to said transmitting means as said transmission modulated signal;
said demodulating means being for making said demodulated signal comprise a reproduced data sequence as a reproduction of said sequence of transmission data, a reproduced clock signal as a reproduction of said reference clock signal, and a reproduced subcarrier signal as a reproduction of said transmission subcarrier signal;
said processing means being for processing said reproduced data sequence, said reproduced clock signal, said reproduced subcarrier signal, said sequence of transmission data, said reference clock signal, and said transmission subcarrier signal to determine said propagation time.

16. A propagation time detecting system as claimed in claim 15, wherein said preliminary modulating means comprises digital modulating means for digitally modulating said transmission subcarrier signal by said transmission data to produce a digitally modulated signal, and means for supplying said digitally modulated signal to said main modulating means as said preliminarily modulated signal.

17. A propagation time detecting system as claimed in claim 16, wherein said digital modulating means is a phase-shift keying modulator.

18. A propagation time detecting system as claimed in claim 15, wherein said reference clock frequency is five kilohertz, said transmission subcarrier frequency being fifty kilohertz.

19. A propagation time detecting system as claimed in claim 15, wherein said main modulating signal has double side-band modulated components.

20. A propagation time detecting system as claimed in claim 15, wherein said demodulating means comprises main carrier reproducing means responsive to said received signal for reproducing said main carrier signal as a reproduced main carrier signal, main demodulating means for demodulating said received signal by said reproduced main carrier signal into a reproduction of said preliminarily modulated signal, and post demodulating means for demodulating said reproduction of the preliminarily modulated signal into said reproduced data sequence, said reproduced clock signal, and said reproduced subcarrier signal.

* * * * *